(12) United States Patent
Jeong

(10) Patent No.: US 10,836,289 B2
(45) Date of Patent: Nov. 17, 2020

(54) HEADREST FOLDING DEVICE

(71) Applicant: WOOBO TECH CO., LTD., Pyeongtaek-si (KR)

(72) Inventor: Hae Il Jeong, Incheon (KR)

(73) Assignee: Woobo Tech Co., Ltd., Pyeongtaek-si (KR)

( * ) Notice: Subject to any disclaimer, the term of this patent is extended or adjusted under 35 U.S.C. 154(b) by 91 days.

(21) Appl. No.: 16/091,191

(22) PCT Filed: Apr. 12, 2017

(86) PCT No.: PCT/KR2017/003941
§ 371 (c)(1),
(2) Date: Oct. 4, 2018

(87) PCT Pub. No.: WO2017/188629
PCT Pub. Date: Nov. 2, 2017

(65) Prior Publication Data
US 2019/0118687 A1 Apr. 25, 2019

(30) Foreign Application Priority Data
Apr. 26, 2016 (KR) .................. 10-2016-0050915

(51) Int. Cl.
*B60N 2/853* (2018.01)
*B60N 2/85* (2018.01)
*B60N 2/856* (2018.01)

(52) U.S. Cl.
CPC .............. *B60N 2/853* (2018.02); *B60N 2/85* (2018.02); *B60N 2/856* (2018.02)

(58) Field of Classification Search
CPC . A47C 7/38; B60N 2/853; B60N 2/85; B60N 2/856; B60N 2/838; F16H 25/20
(Continued)

(56) References Cited

U.S. PATENT DOCUMENTS 4,807,934 A 2/1989 Sakakibara et al.
6,485,096 B1 * 11/2002 Azar .................... B60N 2/0252
297/61
(Continued)

FOREIGN PATENT DOCUMENTS

CN 102837626 A 12/2012
CN 105142976 A 12/2015
(Continued)

OTHER PUBLICATIONS

Japanese Patent Office, Office Action, Application No. 2018-554454, dated Sep. 24, 2019, (with English translation), 6 pages.
(Continued)

*Primary Examiner* — Milton Nelson, Jr.
(74) *Attorney, Agent, or Firm* — Sunstein LLP

(57) ABSTRACT

The present invention relates to a headrest folding device, more particularly, to a headrest folding device comprising a housing, a link rotatably installed in the housing, and a lifting member installed in the housing in a way that it can be lifted or lowered, wherein a stay rod is connected to the link, and wherein the stay rod is slidingly installed in the lifting member, so that the structure becomes significantly simplified, the device becomes compact, and the headrest is stably folded.

12 Claims, 16 Drawing Sheets

(58) Field of Classification Search
USPC .......................................................... 297/403
See application file for complete search history.

(56) References Cited

U.S. PATENT DOCUMENTS

| | | | |
|---|---|---|---|
| 6,749,256 B1* | 6/2004 | Klier | B60N 2/4228 |
| | | | 297/216.12 |
| 8,197,007 B2* | 6/2012 | Lutzka | B60N 2/859 |
| | | | 297/408 |
| 8,926,020 B2 | 1/2015 | Jeong | |
| 9,980,570 B2 | 5/2018 | Jeong | |
| 2007/0236069 A1* | 10/2007 | Chung | B60N 2/859 |
| | | | 297/408 |
| 2012/0013155 A1 | 1/2012 | Hwang et al. | |

FOREIGN PATENT DOCUMENTS

| | | | |
|---|---|---|---|
| JP | S63115837 U | | 7/1988 |
| JP | S64-60444 A | | 3/1989 |
| JP | 05253034 A | * | 10/1993 |
| JP | H0739432 A | | 2/1995 |
| JP | H11-262426 A | | 9/1999 |
| KR | 10-0339847 | | 6/2002 |
| KR | 10-2006-0107096 | | 10/2006 |
| KR | 10-2011-0068845 | | 6/2011 |
| KR | 10-1080313 | | 11/2011 |
| KR | 10-1274451 | | 6/2013 |
| KR | 10-1428664 | | 8/2014 |

OTHER PUBLICATIONS

China National Intellectual Property Administration, Office Action, Application No. 2017800237396, dated Jun. 3, 2020, with English translation, 9 pages.

* cited by examiner

[Fig. 1]
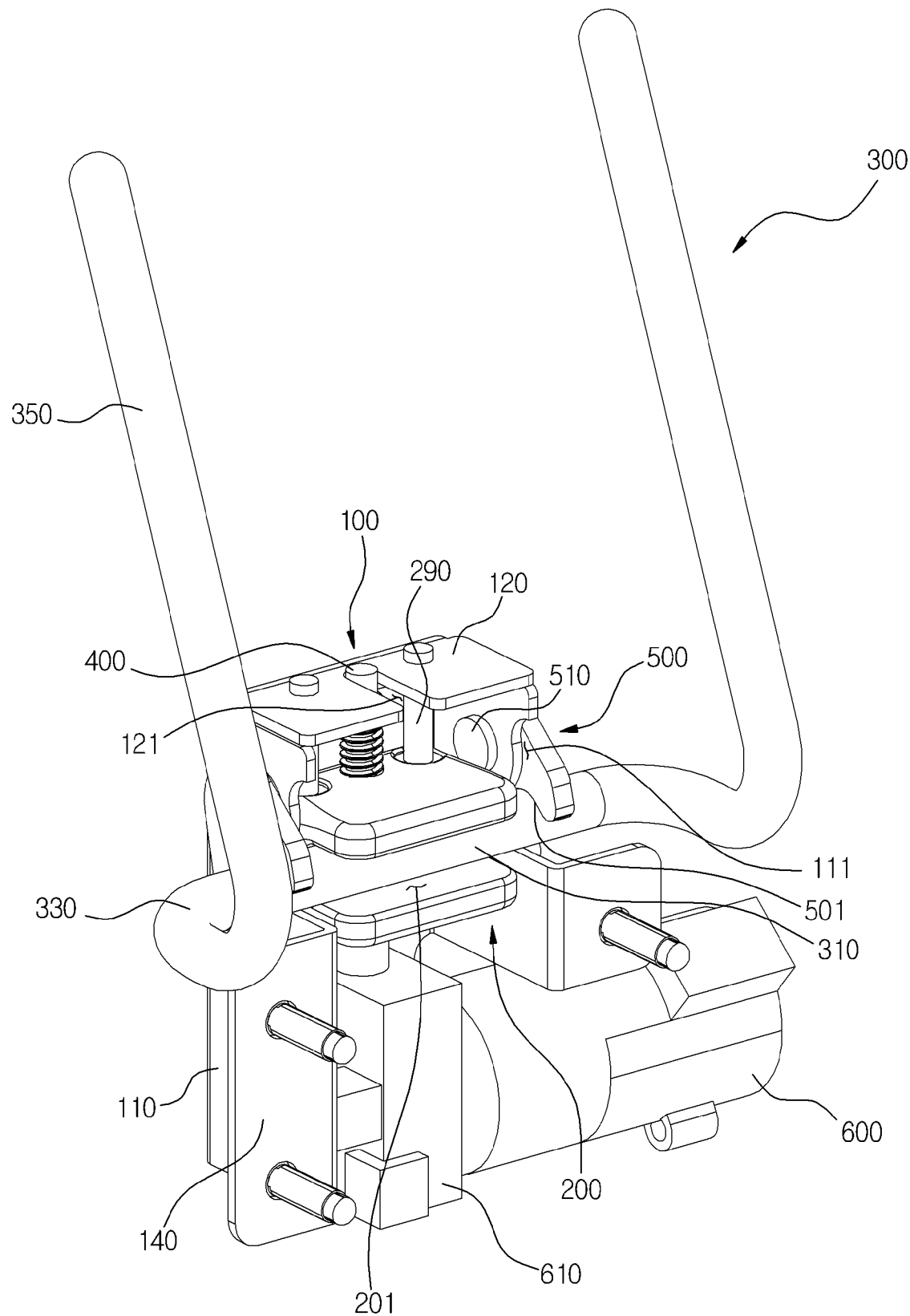

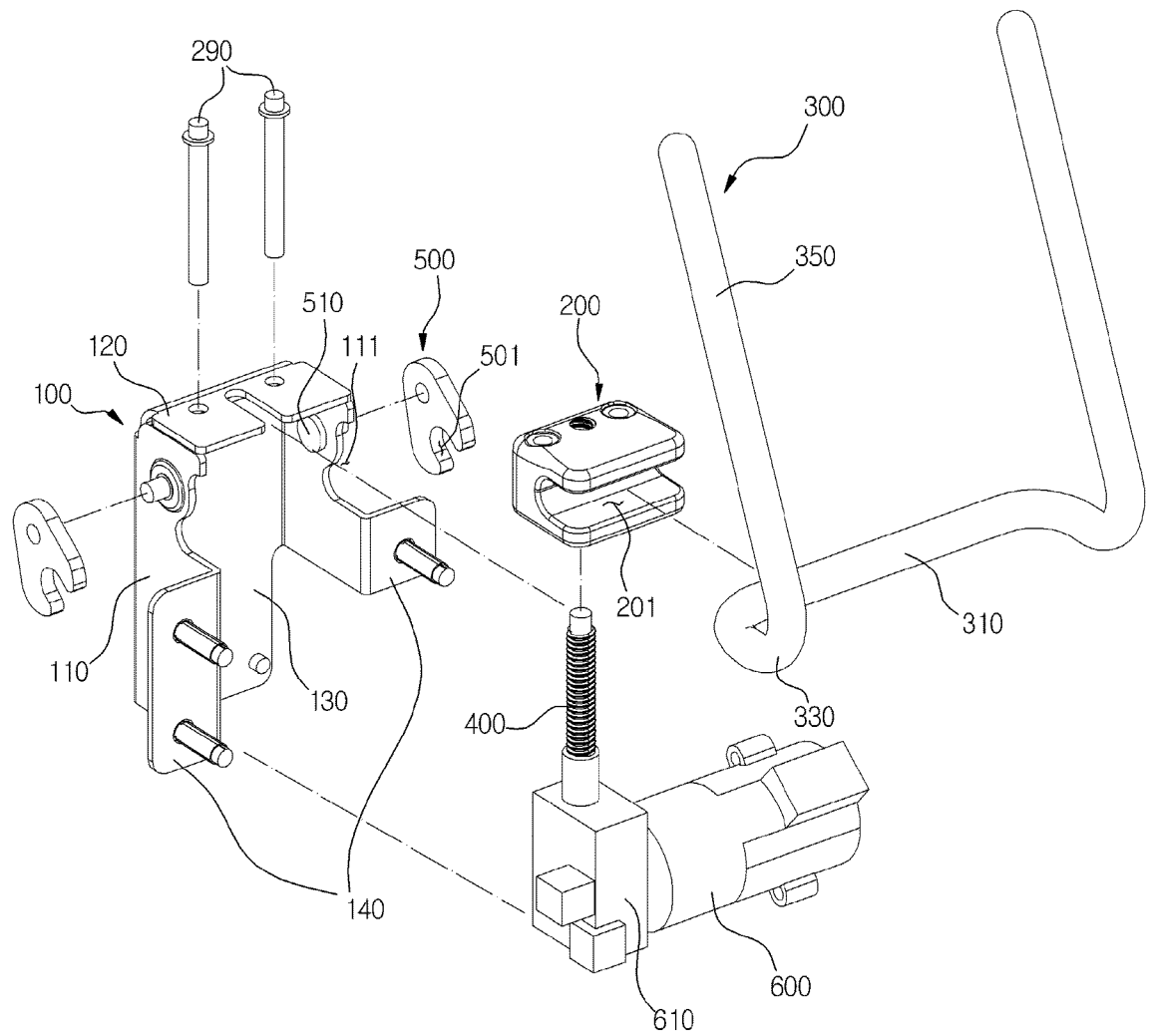
[Fig. 2]

[Fig. 3]
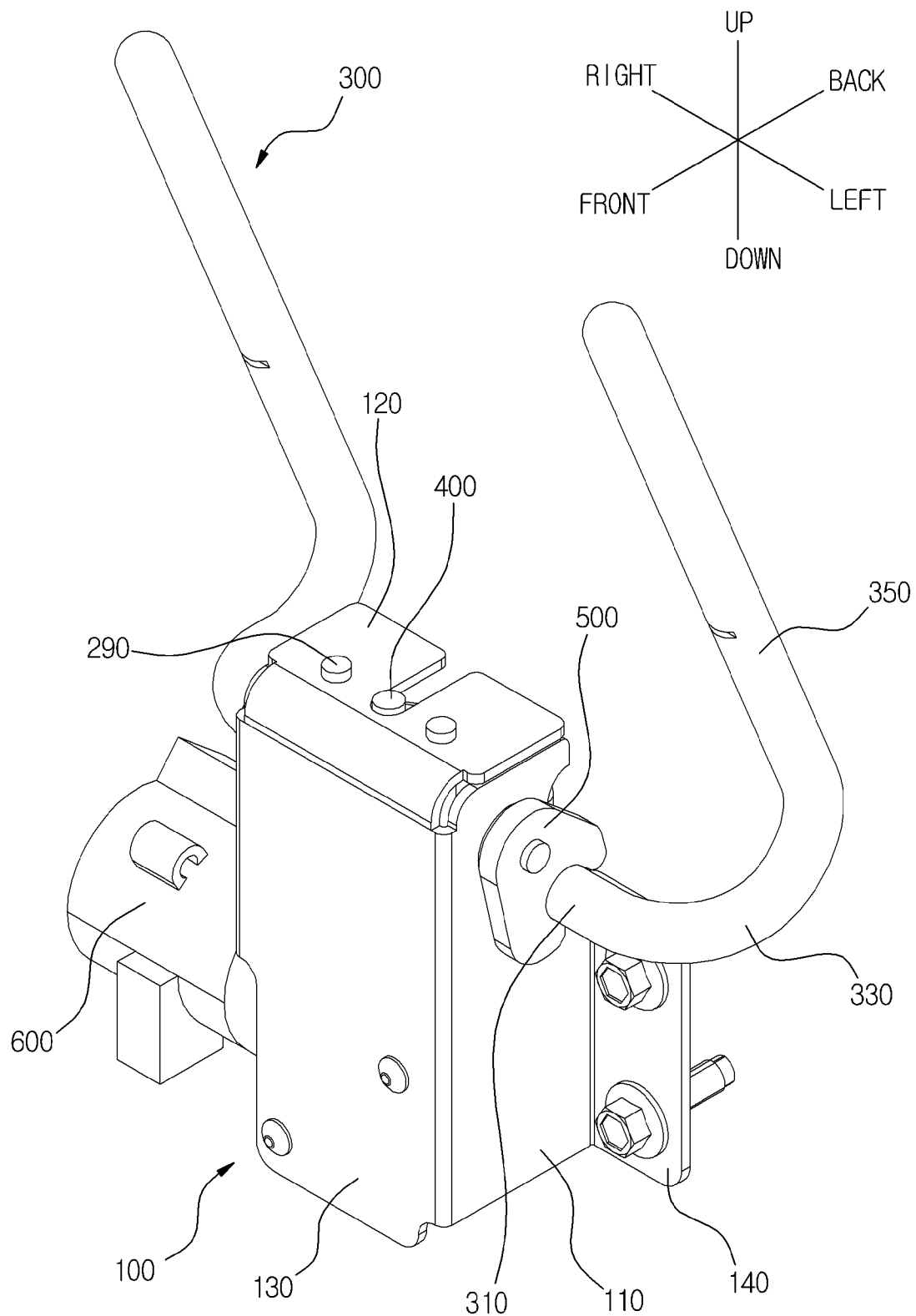

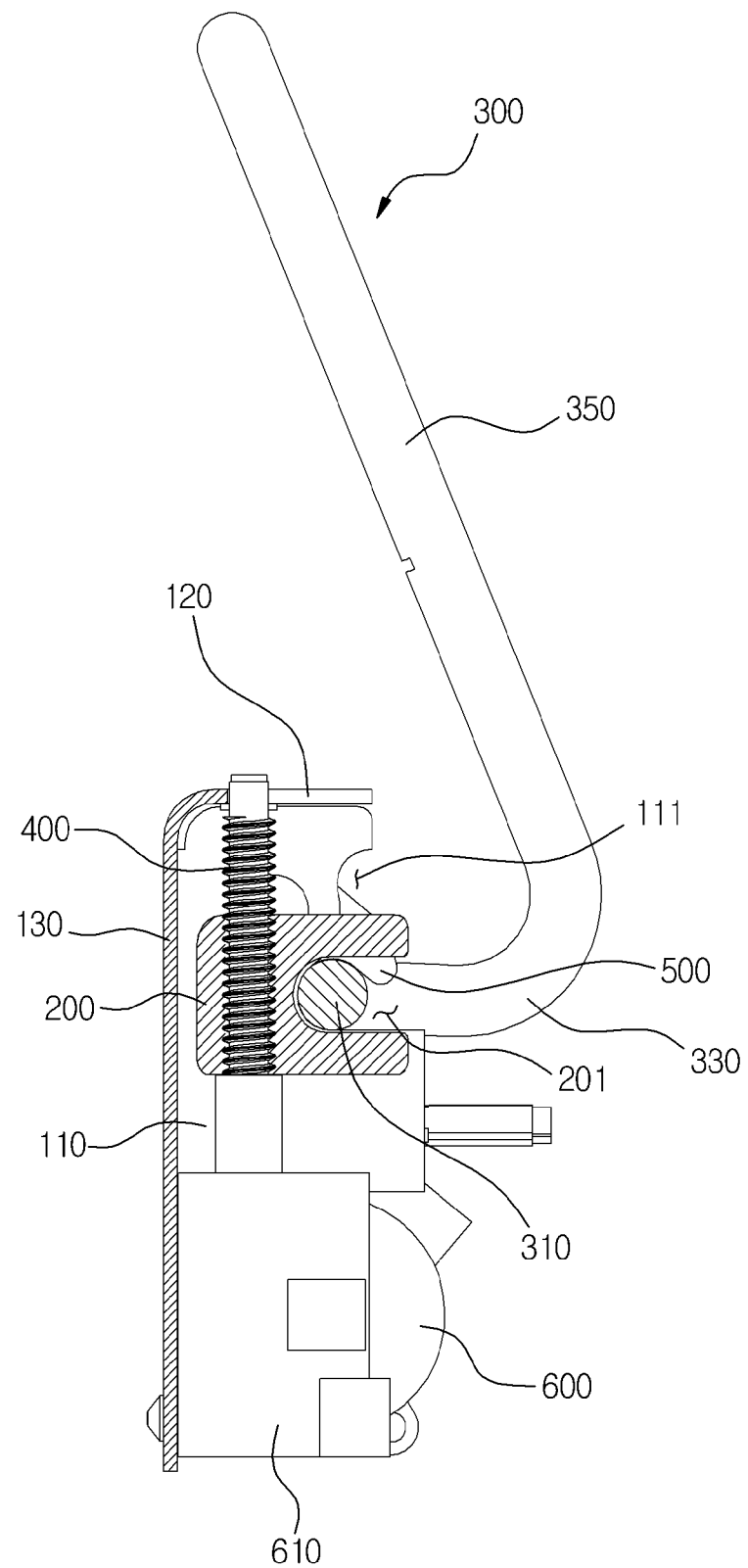
[Fig. 4]

[Fig. 5]
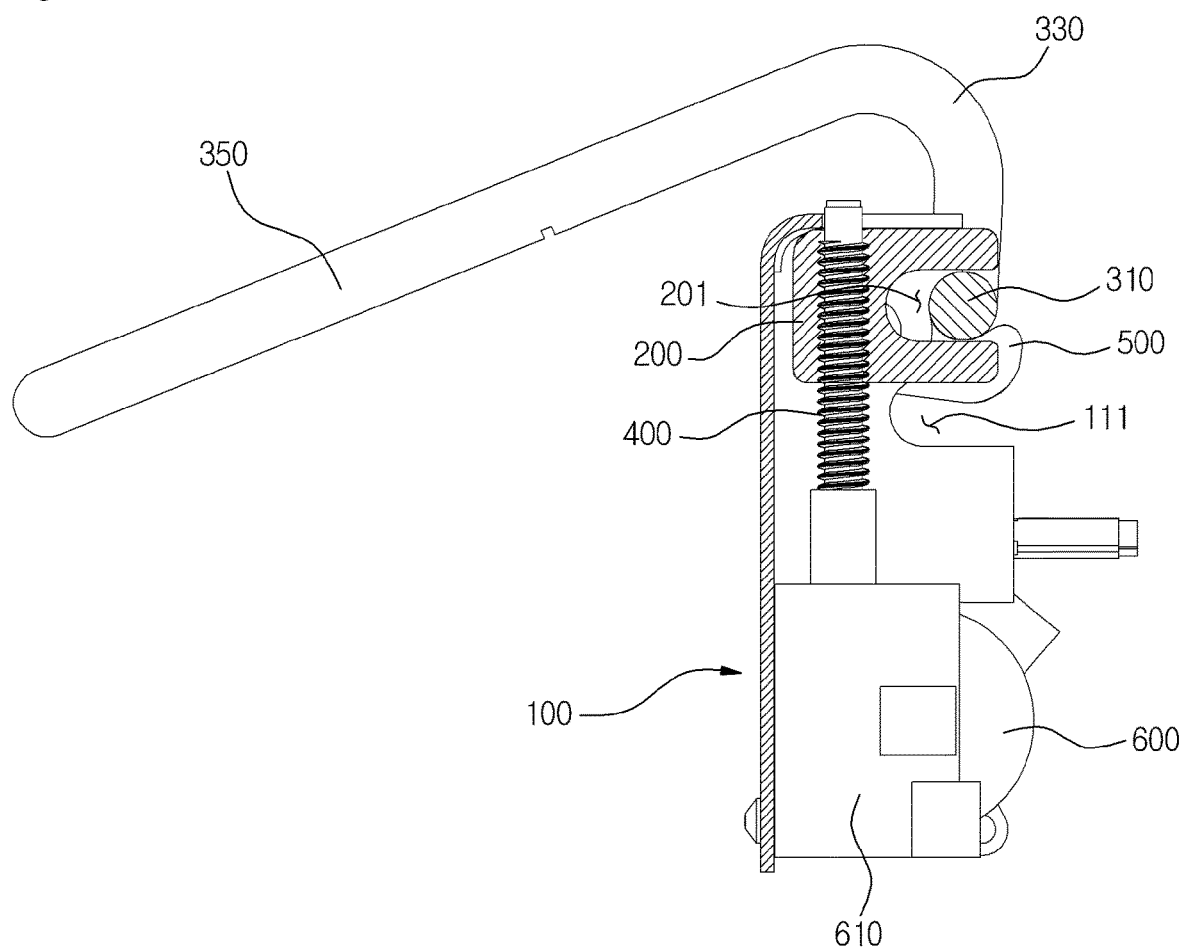

[Fig. 6]
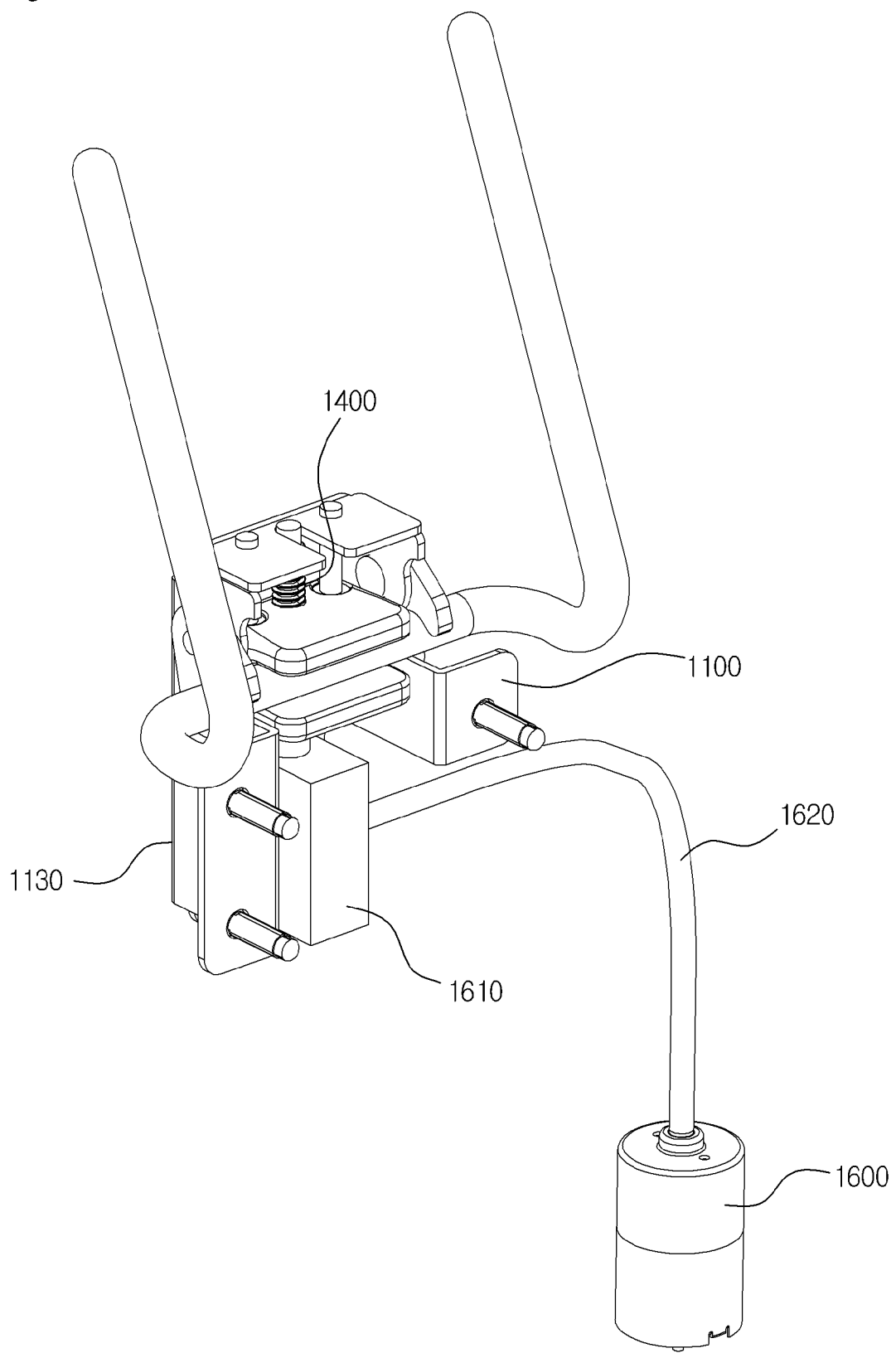

[Fig. 7]
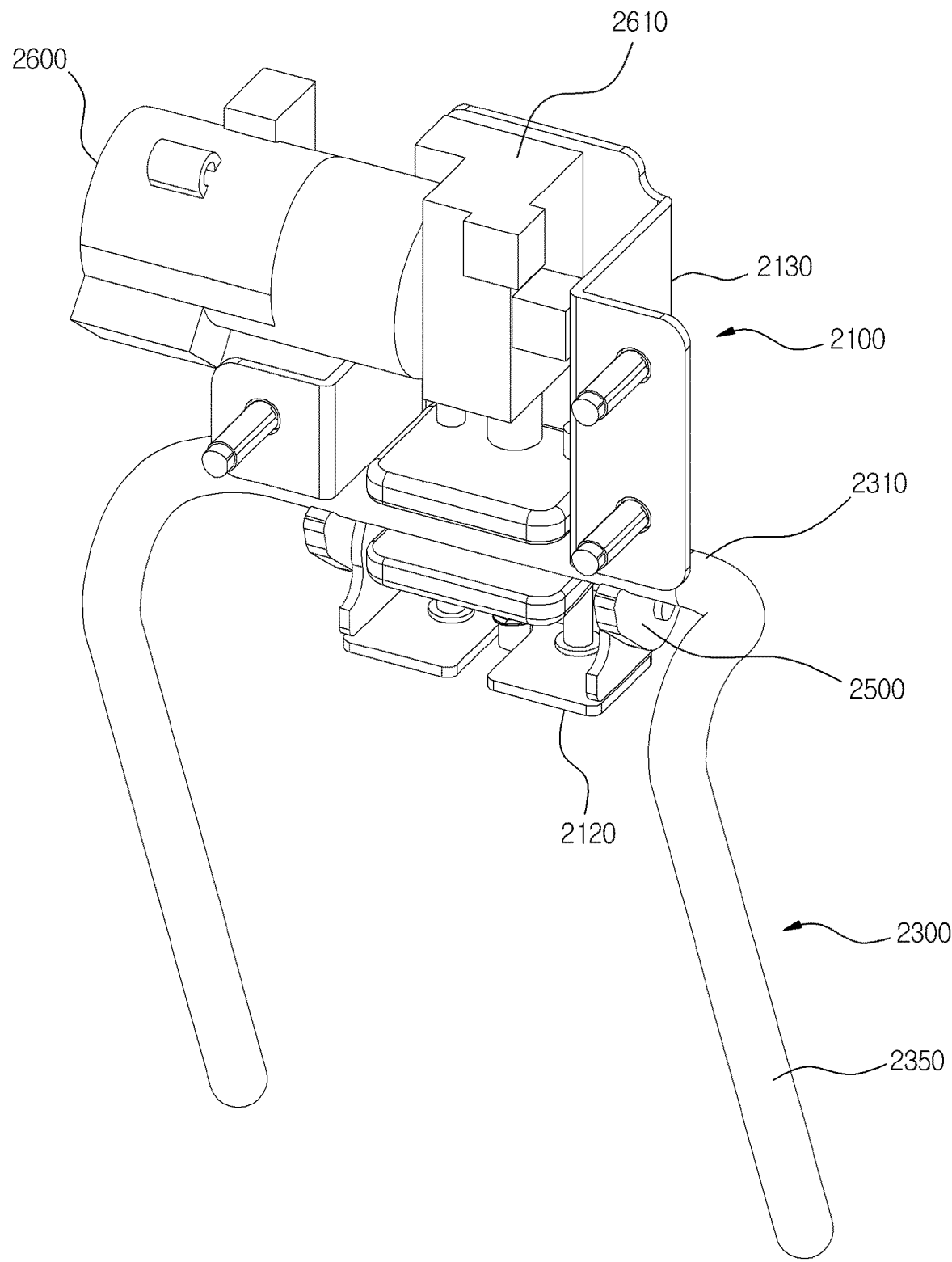

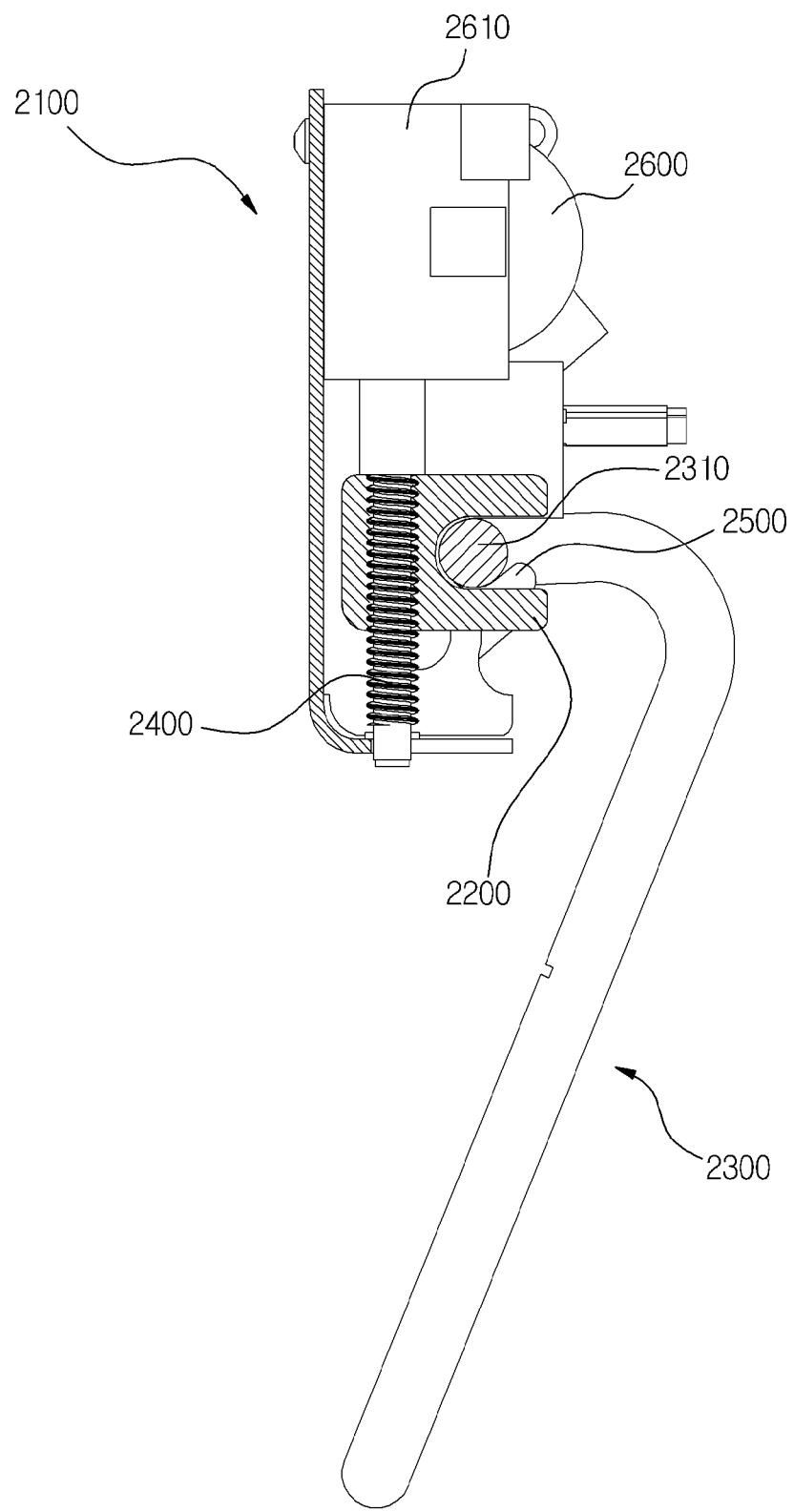
[Fig. 8]

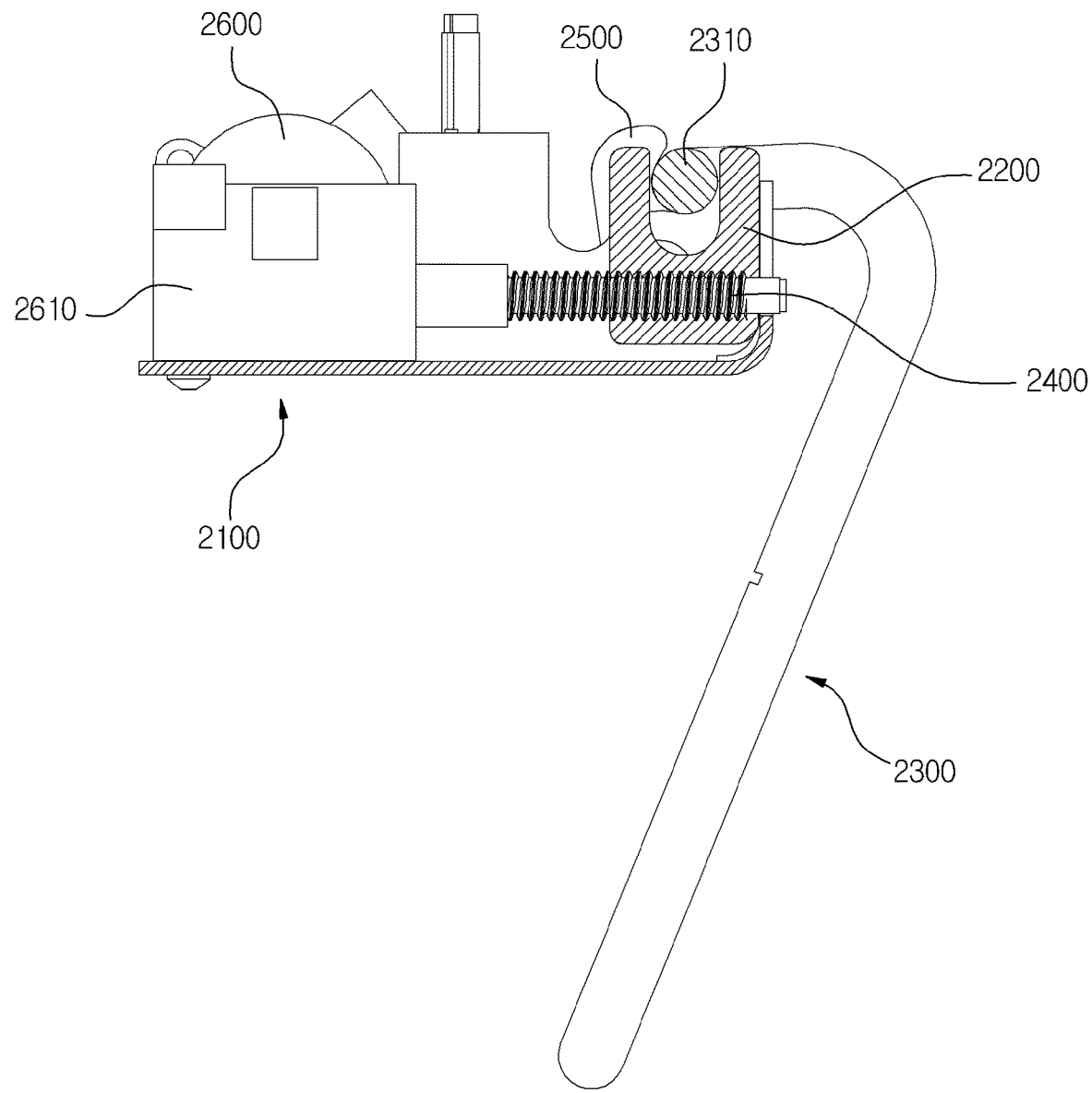
[Fig. 9]

[Fig. 10]
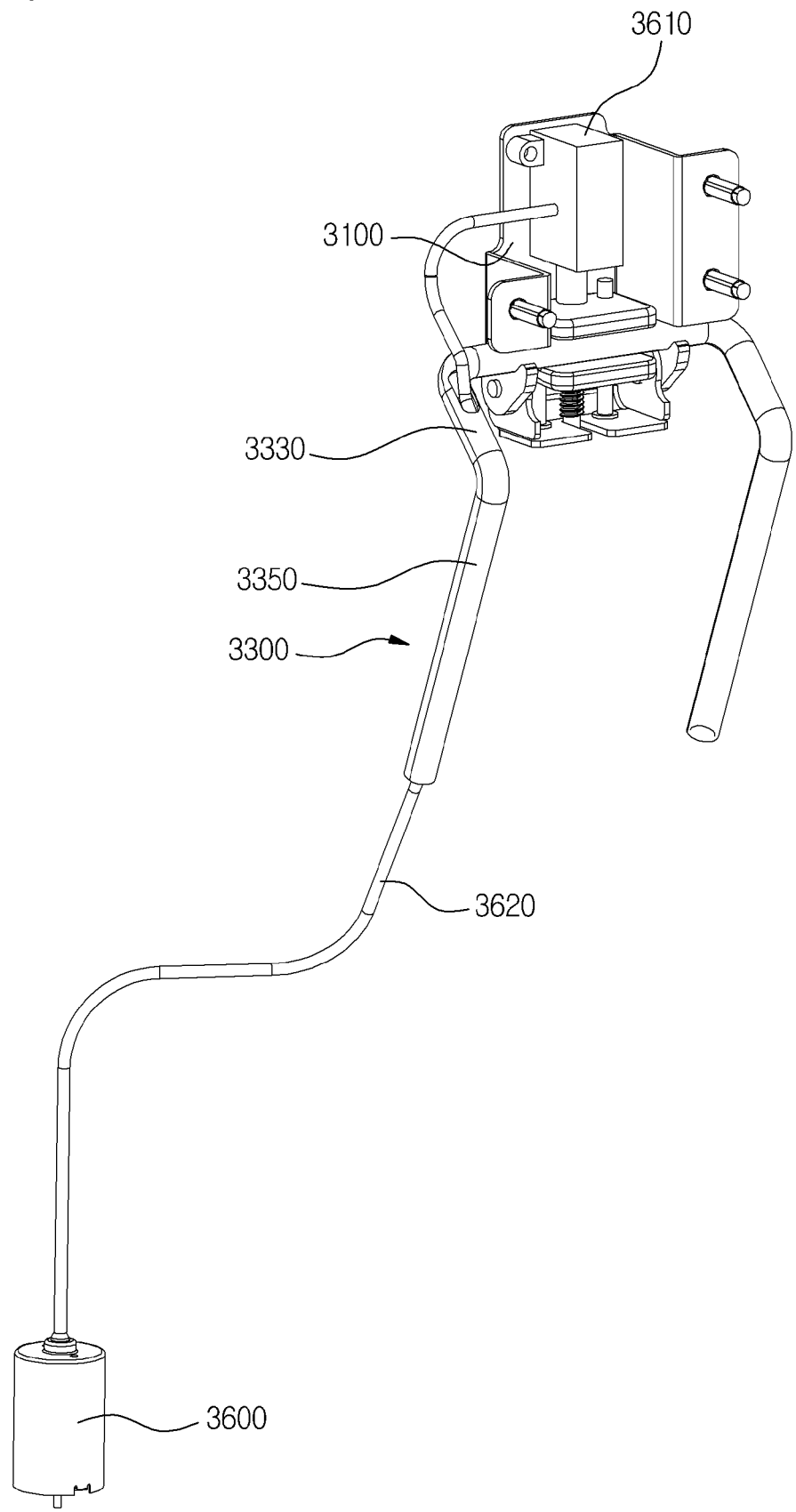

[Fig. 11]
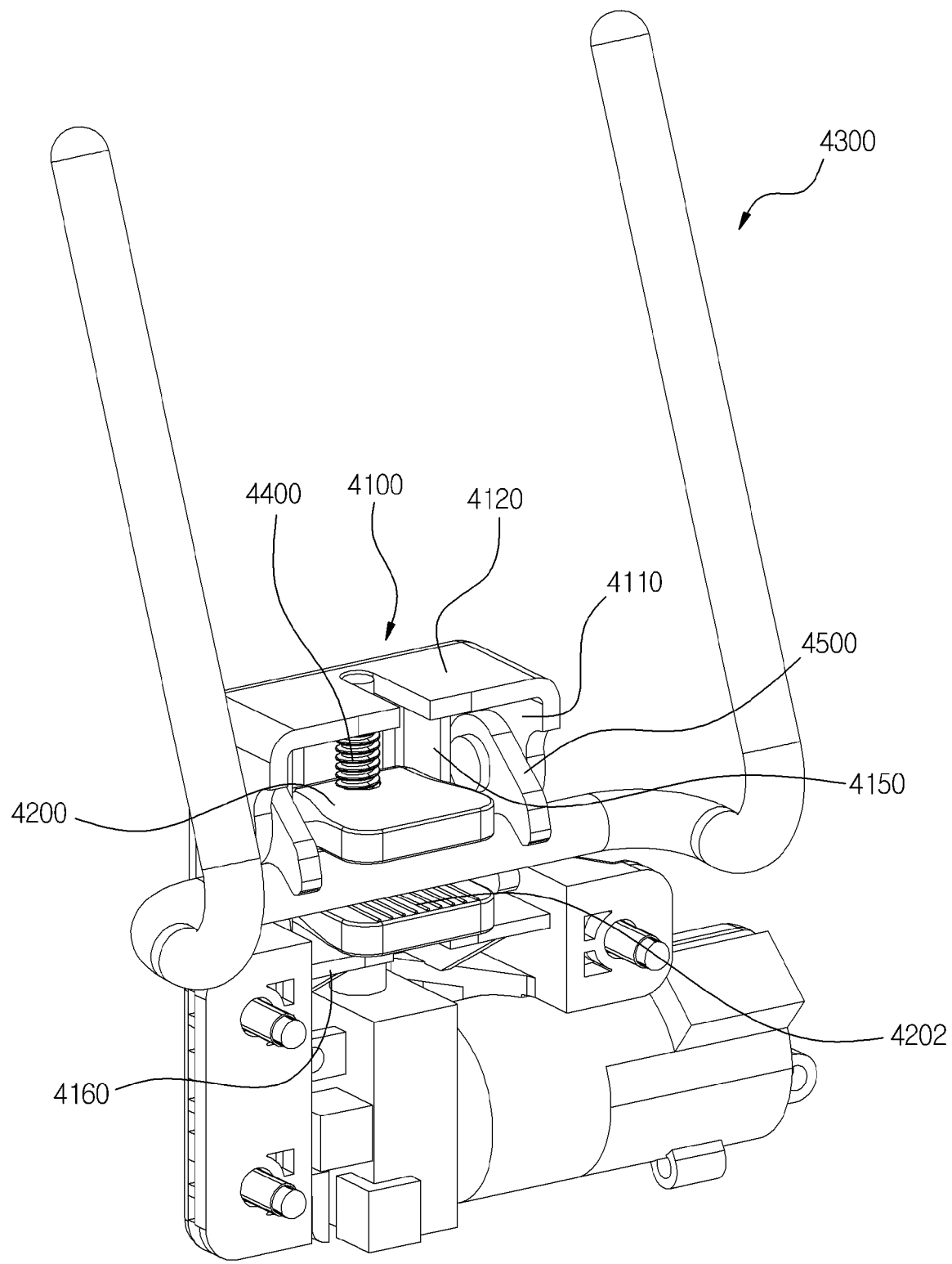

[Fig. 12]
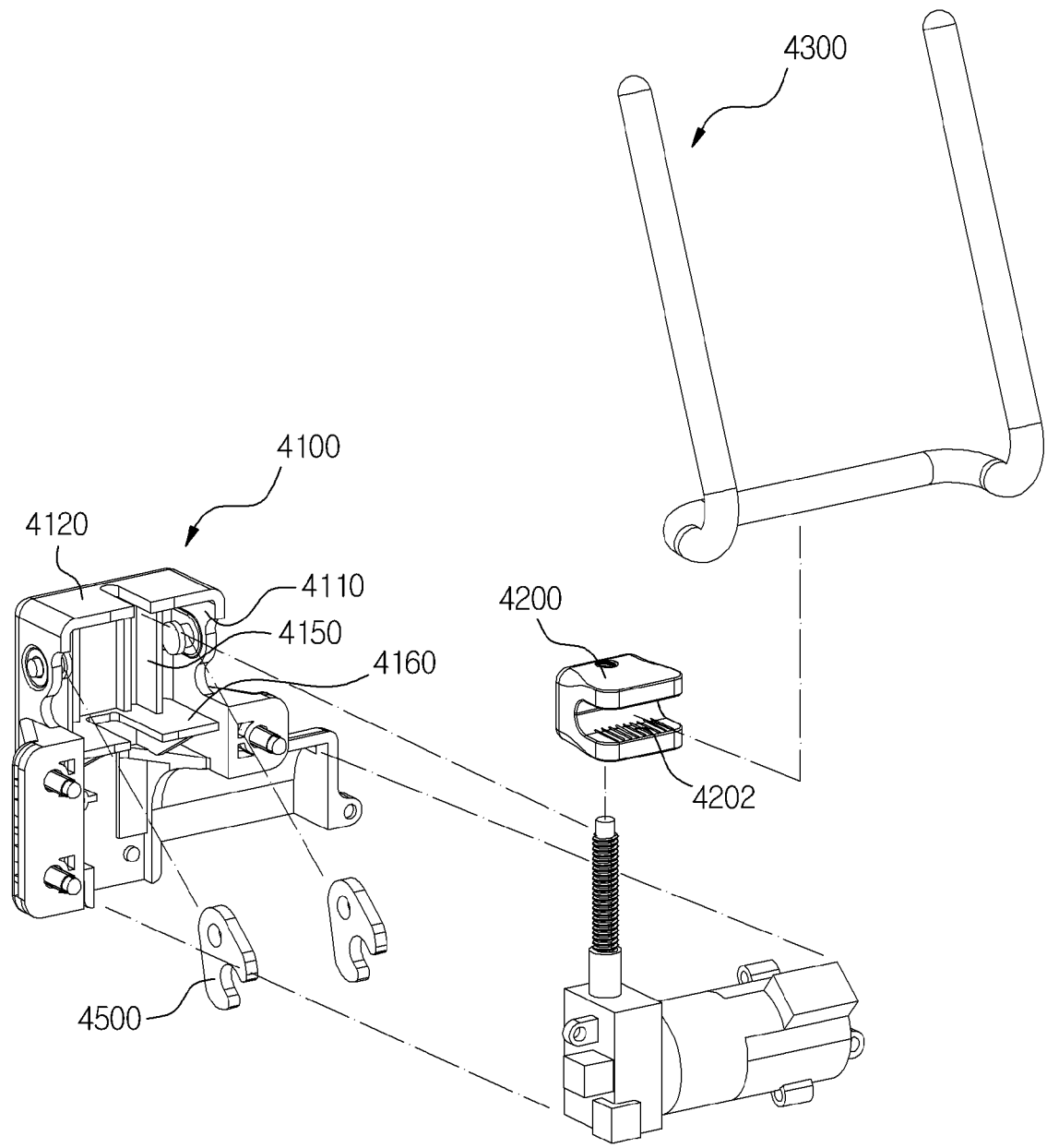

[Fig. 13]
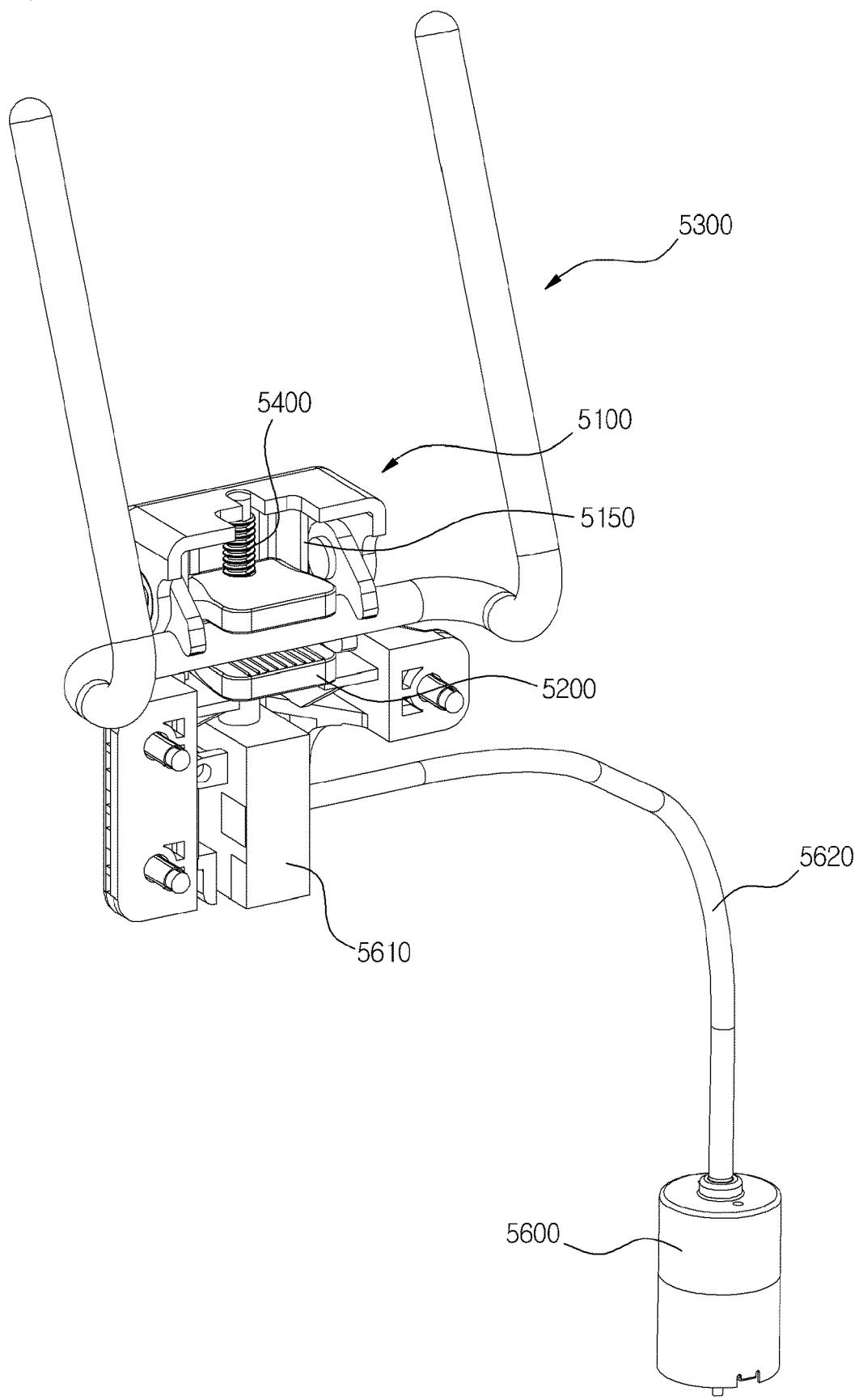

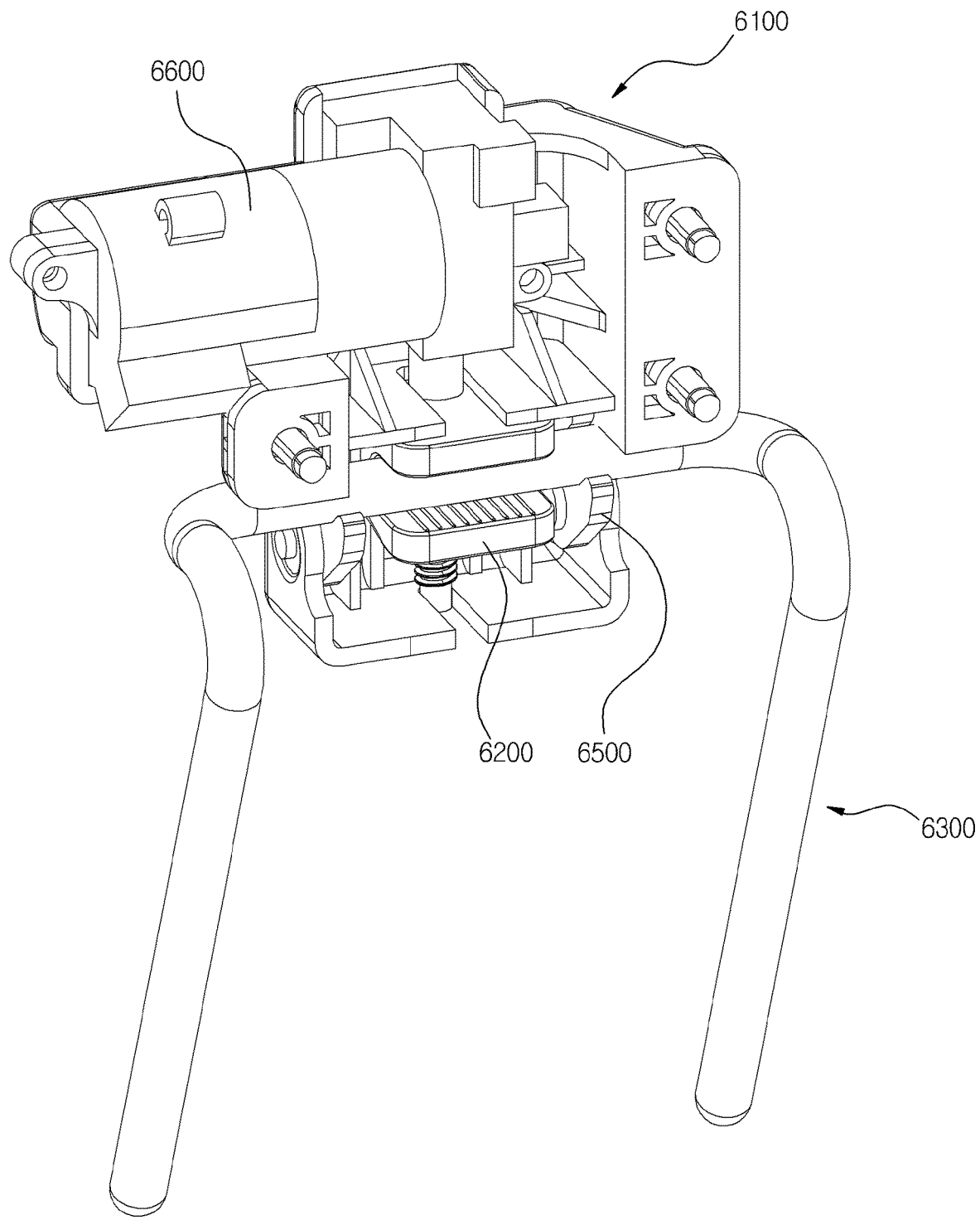
[Fig. 14]

[Fig. 15]
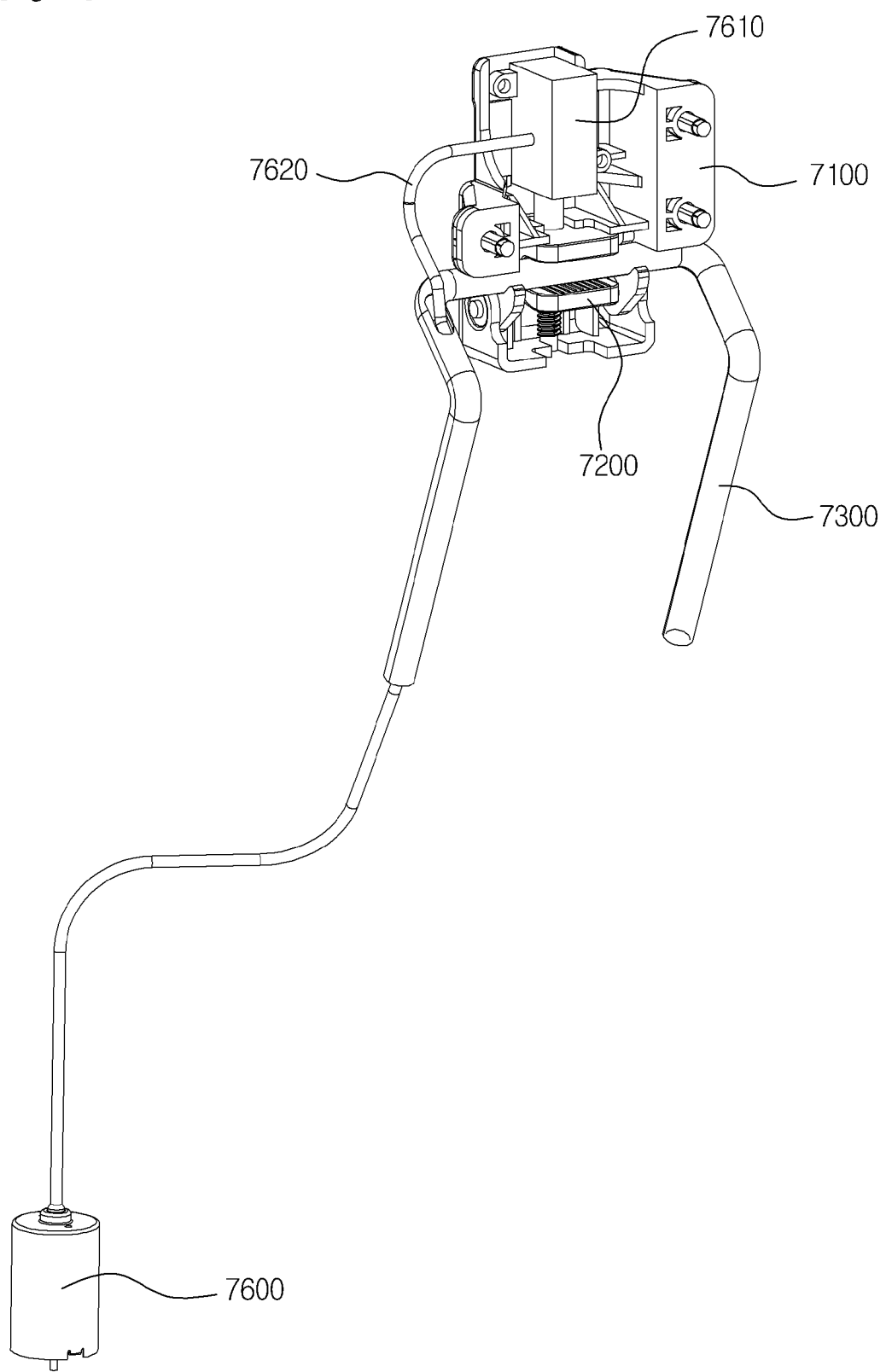

[Fig. 16]
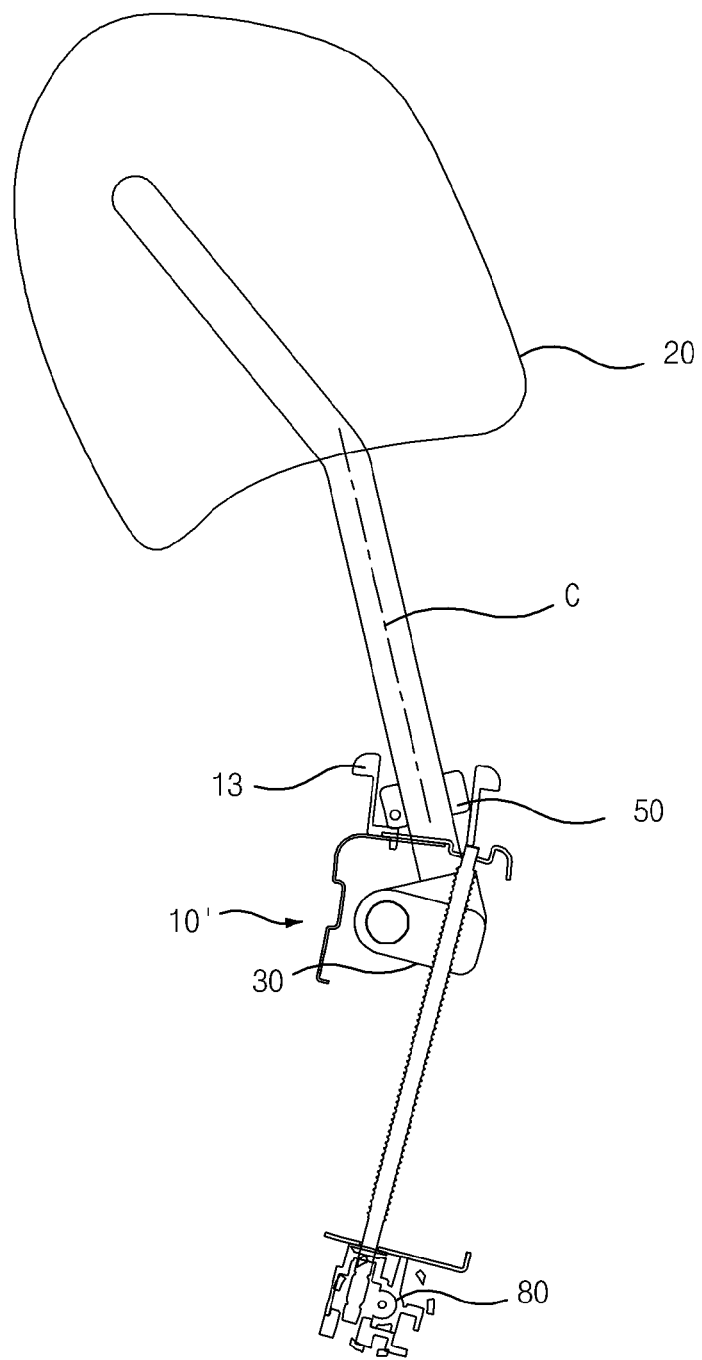

HEADREST FOLDING DEVICE

TECHNICAL FIELD

The present invention relates to a headrest folding device, more particularly, to a headrest folding device comprising a housing, a link rotatably installed in the housing, and a lifting member installed in the housing in a way that it can be lifted or lowered, wherein a stay rod is connected to the link, and wherein the stay rod is slidingly installed in the lifting member.

BACKGROUND ART

As illustrated in FIG. 16, the headrest folding device of the prior art disclosed in Korea Patent Publication No. 2011-0068845 comprises: a withdrawing port 13 fixed to a seat frame 10'; a rotating member 50 rotatably installed in the withdrawing port 13; a stay rod connected to a headrest 20, penetrating the rotating member 50; a connecting portion 30; a moving member rotatably connected to the connecting portion 30, including a mounting portion connected to the stay rod; a screw screw-connected to the connecting portion 30; and a motor 80 rotating the screw, wherein the rotating member 50 is rotating with respect to the withdrawing port 13, and the mounting portion is rotating with respect to the connecting portion 30.

In this way, a rotating member 50 and a mounting portion of the prior art are disposed crossed to each other so that the headrest is being moved frontward or rearward as the lifting portion 30 is moving up or down.

Thus, since the separation distance between the rotating member 50 and the mounting portion must be large in order to increase the folding angle of the headrest, there is a problem that the space occupied by the device becomes large.

Besides, the structure of such a headrest folding device of the prior art is complicated so that there is a problem that it requires more number of components.

Moreover, since it is supported only at both sides of the headrest, there is a problem that the durability is degraded.

LEADING TECHNICAL LITERATURES

Patent Literature

[Patent Literature 1] Korea Patent Publication No. 2011-0068845

DISCLOSURE OF INVENTION

Technical Problem

An objective of the present invention, devised to solve above mentioned problems, is to provide a headrest folding device simple in structure, compact in size, and with an enhanced durability.

Solution to Problem

In order to achieve the above mentioned objective, a headrest folding device of the present invention is characterized in that and comprises: a housing; a pair of links rotatably installed in the housing; and a lifting member installed in the housing in a way that it can be lifted or lowered, wherein a stay rod is connected to the links, and wherein the stay rod is slidingly installed in the lifting member.

A screw rotatably installed in the housing and driven by a motor may further be included, wherein the screw may be screw-coupled to the lifting member.

The housing comprises sidewalls respectively disposed at both sides thereof and a mid-wall disposed between the both sidewalls, wherein the links are installed in the both sidewalls respectively, wherein the screw is rotatably installed in the mid-wall, wherein the lifting member is disposed between the both sidewalls, wherein the stay rod comprises a first bar disposed along the left-to-right direction and a second bar disposed formed at both sides of the first bar and disposed along the up-down direction, wherein the first bar is slidingly installed along the front-to-rear direction in the lifting member, wherein the first bar is disposed at the rear side of the screw, and wherein the both sides of the first bar can be respectively connected to the links.

A guide slot wherein the first bar is inserted is formed in the lifting member along the front-to-rear direction, and the guide slot may be formed in a way that the rear side thereof is open.

A pair of lift guide rods is installed in the housing, and wherein a pair of lift guide slots, wherein the lift guide rods are inserted, may be formed in the lifting member.

A lift guide protrusion guiding the lifting member may be formed in the housing.

The housing may be installed in a vehicle's seat.

The housing may be installed a headrest.

The driving force of the motor can be delivered to the screw through a flexible shaft.

The motor may be installed in the housing.

Advantageous Effects of Invention

According to a headrest folding device as described above, there are advantageous effects as follows.

Its structure can be significantly simplified, the device becomes compact, and the headrest can be folded stably, by including: a housing; a pair of links rotatably installed in the housing; and a lifting member installed in the housing in a way that it can be lifted or lowered, wherein a stay rod is connected to the links, and wherein the stay rod is slidingly installed in the lifting member. Besides, the durability of the device is enhanced since the stay rod being connected to the headrest is dividedly supported by the links and the lifting member.

A screw rotatably installed in the housing and driven by a motor is further included, wherein the screw is screw-coupled to the lifting member, so that the lifting member can be lifted or lowered more stably.

The housing comprises sidewalls respectively disposed at both sides thereof and a mid-wall disposed between the both sidewalls, wherein the links are installed in the both sidewalls respectively, wherein the screw is rotatably installed in the mid-wall, wherein the lifting member is disposed between the both sidewalls, wherein the stay rod comprises a first bar disposed along the left-to-right direction and a second bar disposed formed at both sides of the first bar and disposed along the up-down direction, wherein the first bar is slidingly installed along the front-to-rear direction in the lifting member, wherein the first bar is disposed at the rear side of the screw, and wherein the both sides of the first bar can be respectively connected to the links, so that the device can be maintained compactly, and at the same time, the supporting force for the headrest can be evenly distributed among the both sides and the center of the stay rod, and thus, the durability of the device is more enhanced thereby.

A guide slot wherein the first bar is inserted is formed in the lifting member along the front-to-rear direction, and the guide slot is formed to have an open rear side so that it can be assembled by inserting the stay rod into the lifting member through the open portion, thereby possibly further facilitating the assembly.

A lift guide rod is installed in the housing, and a lift guide groove wherein the lift guide rod is inserted is formed in the lifting member, so that the housing can be formed by using a press, thereby possibly facilitating the manufacturing of the housing. Besides, the durability of the device is enhanced further.

A lift guide protrusion for guiding the lifting member is formed in the housing so that the lifting and lowering movements can be performed smoothly, and at the same time, the number of components can be reduced.

The housing may be installed in the vehicle's seat so that the volume of the headrest can be maintained compactly.

Or, the housing may be installed in the headrest so that it can be easily replaced or repaired when a failure occurs.

Since the driving force of the motor is delivered to the screw through a flexible shaft, the motor can be installed in various locations, so that the transmission of the vibration, the noise, and the like of the motor towards the user can be minimized.

The motor is installed in the housing so that the device can be modularized, thereby facilitating the installation and the like.

BRIEF DESCRIPTION OF DRAWINGS

FIG. 1 is a rear perspective view of a headrest folding device according to the first exemplary embodiment of the present invention.

FIG. 2 is an exploded perspective view of a headrest folding device according to the first exemplary embodiment of the present invention.

FIG. 3 is a front perspective view of a headrest folding device according to the first exemplary embodiment of the present invention.

FIG. 4 is a cross-sectional view of a headrest folding device according to the first exemplary embodiment of the present invention (erection state).

FIG. 5 is a cross-sectional view of a headrest folding device according to the first exemplary embodiment of the present invention (folding state).

FIG. 6 is a rear perspective view of a headrest folding device according to the second exemplary embodiment of the present invention.

FIG. 7 is a rear perspective view of a headrest folding device according to the third exemplary embodiment of the present invention.

FIG. 8 is a cross-sectional view of a headrest folding device according to the third exemplary embodiment of the present invention (erection state).

FIG. 9 is a cross-sectional view of a headrest folding device according to the third exemplary embodiment of the present invention (folding state).

FIG. 10 is a rear perspective view of a headrest folding device according to the fourth exemplary embodiment of the present invention.

FIG. 11 is a rear perspective view of a headrest folding device according to the fifth exemplary embodiment of the present invention.

FIG. 12 is an exploded perspective view of a headrest folding device according to the fifth exemplary embodiment of the present invention.

FIG. 13 is a rear perspective view of a headrest folding device according to the sixth exemplary embodiment of the present invention.

FIG. 14 is a rear perspective view of a headrest folding device according to the seventh exemplary embodiment of the present invention.

FIG. 15 is a rear perspective view of a headrest folding device according to the eighth exemplary embodiment of the present invention.

FIG. 16 is a cross-sectional view of a headrest folding device of the prior art.

MODE FOR THE INVENTION

Hereinafter, a door latch system according to the first exemplary embodiment of the present invention will be described in detail with reference to the accompanying drawings as follows.

For reference, components of the present invention which are the same as those of the prior art as described above will not be described separately while referring to the prior art described above.

As used herein the singular includes the plural unless otherwise specified in the text.

Embodiment 1

As illustrated in FIGS. 1 to 5, a headrest folding device of the first exemplary embodiment is characterized in that and comprises: a housing 100; a pair of links 500 rotatably installed in the housing 100; and a lifting member 200 installed in the housing 100 in a way that it can be lifted or lowered, wherein a stay rod 300 is connected to the links 500, and wherein the stay rod 300 is slidingly installed in the lifting member 200.

The housing 100 comprises: a front surface 130; sidewalls 110 respectively disposed at both sides of the front surface 130; and a mid-wall 120 disposed between the both sidewalls 110.

The housing 100 is integrally formed with the first surface 130, the side walls 110, and the mid-wall 120.

In this exemplary embodiment and the exemplary embodiments hereinafter, the front side means the folding direction of the headrest.

The front surface 130 is formed with a flat plate, and formed to be a rectangular whose up-down length is longer than the left-to-right length thereof.

The sidewalls 110 are formed with flat plates, and being connected to the left and right sides of the front surface 130 respectively.

The sidewalls 110 are formed in a way that the left and right sides of the front surface 130 are bended rearward.

Stay guide grooves 111 are formed in the upper rear sides of the both side walls 110 in a way that the both sides and the rear side thereof are open. The stay rod 300 is inserted into the stay guide grooves 111. The stay guide grooves 111 guide the stay rod 300.

The stay guide grooves 111 are formed to be the shape of an arc. The stay guide grooves 111 are formed in a way that the stay rod 300 is disposed at the bottommost end of the stay guide grooves 111 when the headrest is in the erected position while the stay rod 300 is disposed at the uppermost end of the stay guide grooves 111 when the headrest is in the folding position. In this way, the stay guide grooves 111 play the role of a stopper simultaneously.

In addition, a shaft inserting hole wherein a hinge shaft 510 of the link 500 is inserted along the left-to-right direction is penetratingly formed in the upper portion of the side wall 110. The shaft inserting hole is disposed at the front side of the stay guide groove 111.

In the sidewall 110, in the surface facing the link 500, the circumference of the shaft inserting hole is embossing treated (protruded), therefore, a gap is formed between the sidewall 110 and the link 500. Owing to this, the friction is reduced when the link 500 is rotated against the sidewall 110.

Further, brackets 140 are formed in the lower rear sides of the side walls 110.

The brackets 140 are formed by outwardly bending the lower rear portions of the sidewalls 110.

Thus, the brackets 140 are formed outwardly protruded in the lower rear portions of the housing 100.

In the brackets 140, coupling holes are penetratingly formed along the front-to-rear direction wherein bolts, rivets, and the like can be coupled.

The housing 100 can be easily installed in the frame of a vehicle's seat through such brackets 140. The housing 100 is disposed in the middle upper portion of the seat.

A cut-off hole can be formed in the lower portion of one side sidewall 110 so that a motor 600, which will be described later, can be inserted thereto.

The mid-wall 120 is disposed in the upper portions of the both sidewalls 110.

The mid-wall 120 is connectedly formed with the upper portions of the front surface 130.

The mid-wall 120 is formed in a way that the upper portion of the front surface 130 is bended rearward.

A screw inserting slot 121 is penetratingly formed along the up-down direction in the mid-wall 120.

The rear side of the screw inserting slot 121 is formed to be open.

The lower portion (opposite side surface of mid-wall) of the housing 100 is formed to be open.

Such housing 100 can be easily formed through press machining process. The durability can be further enhanced when the housing 100 is formed with a metallic material.

The stay rod 300 comprises: a first bar 310; a pair of second bars 350 formed respectively at the both sides of the first bar 310, disposed along the up-down direction; and a third bar 330 connecting the first bar 310 and the second bar 350.

The stay rod 300 is formed with a metallic material, and formed integrally.

The stay rod 300 is formed in the shape of a pipe or a circular rod.

The first bar 310 is disposed horizontally.

When the headrest is in an erected state, the second bars 350 are inclinedly disposed so that the upper ends are disposed more forwardly than the lower ends thereof.

The upper ends of the second bars 350 are disposed more forwardly than the front end of the first bar 310.

The lower ends of the second bars 350 are disposed more rearwardly than the rear end of the first bar 310.

The third bar 330 is curvedly formed in the shape of an arc.

The upper portions of the second bars 350 are exposed outside of the seat, and a headrest is installed in the upper portions of the second bars 350.

The links 500 are formed in the shape of a plate, and vertically disposed along the front-to-rear direction.

The links 500 are rotatably installed in the housing 100 through the hinge shafts 510.

The links 500 are provided in two, and disposed in the outer sides of the both sidewalls 110 of the housing 100 respectively.

In the links 500, shaft inserting holes wherein the hinge shafts 510 are inserted are penetratingly formed along the left-to-right direction, and shaft receiving grooves 501 wherein the first bar 310 of the stay rod 300 is received and fixedly installed are formed in the rear side of the links. That is, the shaft receiving grooves 501 are disposed in the rear side of the shaft insertion holes. The shaft receiving grooves 501 are disposed spaced apart from the shaft inserting holes.

The shaft receiving grooves 501 are penetratingly formed along the left-to-right direction, and formed in a way that the rear sides thereof are open. Thus, the shaft receiving grooves 501 are formed in the shape of "c".

Owing to such shaft receiving grooves 501, the stay rod 300 can be easily installed fixedly to the links 500.

The shaft receiving grooves 501 are inclinedly formed so that the front ends are disposed more upwardly than the rear ends.

In the link 500, an upper protruded portion and a lower protruded portion are formed in the upper and lower sides of the shaft receiving groove 501 respectively. The upper protruded portion is disposed in the upper side of the first bar 310, and the lower protruded portion is disposed in the lower side of the first bar 310. The upper protruded portion and the lower protruded portion are formed protruded rearward, and the rear ends of the upper protruded portion and the lower protruded portion are formed more rearwardly protruded than the rear end of the first bar 310.

When the headrest is in an erected state, the upper protruded portions are protruded more downwardly than the uppermost end of the first bar 310, and thus, there is an effect of strength reinforcement.

When the headrest is in a folding state, the lower protruded portions are protruded more upwardly than the lowermost end of the first bar 310, and thus, there is an effect of strength reinforcement.

Owing to such links 500, the stay rod 300 can be rotated with respect to the housing 100.

In this way, the both sides of the first bar 310 of the stay rod 300 are directly connected to the links 500. Unlike this, a different member can be provided between the links 500 and the stay rod 300 for an indirect connection.

The lifting member 200 is formed in the shape of a block, and installed in the housing 100 in a way that it can be lifted or lowered. The lifting member 200 is formed in a way that the left-to-right width is longer than the up-down length thereof. Thus, the stay rod 300 and the lifting member 200 are in line contact or point contact (in a case wherein protrusions are formed as described hereinbelow) with each other at the upper portion or the lower portion in length along the left-to-right direction.

The lifting member 200 is disposed between the both sidewalls 110. Also, the lifting member 200 is disposed in the lower side of the mid-wall 120. That is, the lifting member 200 is disposed so as to be surrounded by the sidewalls 110 and the mid-wall 120.

In the lifting member 200, the first bar 310 of the stay rod 300 is installed in a way that it can be slided along the front-to-rear direction.

In the rear side of the lifting member 200, a guide slot 201 wherein the middle portion of the first bar 310 is inserted is formed along the front-to-rear direction. Thus, the lifting member 200 is formed in the shape of "c" when viewed from the left side thereof.

The guide slot 201 is formed in a way that the both sides and the rear side thereof are open so that the first bar 310 can be inserted into the guide slot 201 through the open portion thereof, thereby facilitating the assembling process.

Further, in the lifting member 200, a protrusion (not shown) may be formed in length along the front-to-rear direction in the surface where the stay rod 300 is in contact with. The protrusion is disposed inside the guide slot 201, and formed in multiple numbers. Owing to such protrusions, the friction between the lifting member 200 and the stay rod 300 is reduced, so that the sliding of the stay rod 300 can be performed more smoothly.

Further, it is rotatably installed in the mid-wall 120 of the housing 100, and a screw 400 driven by a motor 600 may be further included.

The screw 400 is vertically disposed along the up-down direction. A flat portion having no thread is formed in the outer circumferential surface in the upper portion of the screw 400.

The flat portion of the screw 400 is inserted into the screw insertion slot 121 of the housing 100. Thus, the screw 400 becomes rotatable with respect to the housing 100. A bearing may be disposed between the screw 400 and the housing 100 so that the screw 400 can be rotated more smoothly.

Additionally, the open portion (rear side) of the screw inserting slot 121 may be sealed after the screw 400 is assembled so that the screw 400 will not be separated. However, even without such finishing treatment, the screw 400 will not be separated towards the rear direction since, after the assembly, the screw 400 is inserted into the lifting member 200 and the lifting member 200 is held by the first bar 310 of the stay rod 300. In addition, since a reduction gear 610 connected to the screw 400 is fixedly installed in the housing 100, the screw 400 is fixed to the housing 100 along the front-to-rear direction.

A screw coupling hole is formed in the lifting member 200 in the front side of the guide slot 201. The screw coupling hole is penetratingly formed along the up-down direction. The screw 400 is screw-coupled into the screw coupling hole. Thus, when the screw 400 is rotated with respect to the housing 100 by the motor 600, the lifting member 200 is lifted or lowered along the up-down direction.

Thus, the first bar 310 is disposed in the rear side of the screw 400.

In addition, lift guide rods 290 are installed in the housing 100, and lift guide slots wherein the lift guide rods 290 are inserted are formed in the lifting member 200.

Flanges are formed in the upper portions of the guide rods 290. When assembled, the flanges are held by the lower portion of the mid-wall 120. Thus, the lift guide rods 290 will not be separated from the housing 100 after assembled.

The lift guide rods 290 are vertically disposed along the up-down direction, and the upper ends thereof are fixedly installed in the mid-wall 120 through rivets and the like. The lift guide rods 290 are disposed at the both sides of the screw 400 respectively. That is, the lift guide rods 290 are disposed between the sidewalls 110 and the screw 400.

The lower portions of the lift guide rods 290 are disposed freely without being bound to other members.

The lift guide slots are disposed at the front side of the guide slot 201.

Flange receiving grooves wherein the flanges are received so as to be communicating with the lift guide slots are formed in the upper surface of the lifting member 200.

The motor 600 is installed in the lower side of the housing 100.

The reduction gear 610 is connected to the shaft of the motor 600, and the lower portion of the screw 400 is connected to the reduction gear 610.

The reduction gear 610 is installed in the rear surface of the front surface 130. The reduction gear 610 is disposed between the both sidewalls 110.

The motor 600 and the reduction gear 610 are disposed in the lower side of the lifting member 200.

Hereinafter, an operational process of the headrest folding device having the aforementioned configuration and according to the exemplary embodiment of the present invention will be described.

<Headrest Folding>

When the motor 600 is operated by a user or sensors and the like, the screw 400 is rotated thereby. As the screw 400 is rotated, the lifting member 200 is moved upward.

When the lifting member 200 is moved upward, the center portion of the first bar 310 of the stay rod 300 is also lifted upward by the lifting member 200. Due to the stay rod 300 being lifted upward, the links 500 fixed to the stay rod 300 are rotated counterclockwise with respect to the housing 100. In addition, since the both sides of the first bar 310 of the stay rod 300 are fixed to the rear sides of the links 500, thereby rotating counterclockwise. And, since the lifting member 200 is moved only along the up-down direction with respect to the housing 100 and the center of the hinge shafts 510 of the links 500, the stay rod 300 is being slided towards the rear side of the lifting member 200 as the lifting member 200 is being moved towards the upper portion.

When the upper surface of the lifting member 200 touches the lower surface of the mid-wall 120, the folding of the headrest is completed.

When the folding of the headrest is completed, the center of the guide slot 201 of the lifting member 200 is moved more upwardly than the centers of the hinge shafts 510 of the links 500.

Even when the folding of the headrest has been completed, the state wherein the stay rod 300 is inserted into the guide slot 201 of the lifting member 200 is being maintained.

By providing sensors detecting the completion of the folding or erection of the headrest, it can be controlled through the control unit so that the operation of the motor 600 is stopped once the folding or erection is completed. Unlike this, it can be controlled in a way that the motor is stopped after the motor 600 is being operated for a predetermined period of time. Unlike this, once the folding or erection has been completed, the motor 600 can be stopped due to the overloading thereof when the lifting member 200 is held by the mid-wall 120 or the lower end of the screw 400, or when the first bar 310 of the stay rod 300 is held by the uppermost end or lowermost end of the stay guide grooves 111.

<Headrest Erection>

When the motor 600 is operated by a user or sensors and the like, the screw 400 is rotated towards the opposite direction. As the screw 400 is rotated in the opposite direction, the lifting member 200 is moved downward.

When the lifting member 200 is moved downward, the stay rod 300 is also being pushed downward by the lifting member 200. Due to the stay rod 300 being pushed as described above, the links 500 fixed to the stay rod 300 are rotated along the clockwise direction with respect to the housing 100. In addition, since the stay rod 300 is fixed to the rear side of the rotating links 500 the stay rod 300 is also rotated along the clockwise direction. And, since the lifting member 200 is moved only along the up-down direction with respect to the housing 100 and the center of the hinge shafts 510 of the links 500, the stay rod 300 is being slided towards the front side of the lifting member 200 as the lifting member 200 is being moved towards the lower portion.

When the stay rod 300 is held by the lower ends of the stay guide grooves 111 the erection of the headrest is completed. Even when the erection of the headrest has been completed, the state wherein the stay rod 300 is inserted into the guide slot 201 of the lifting member 200 is being maintained.

In this way, when the lifting member 200 is lifted or lowered, the force is delivered to the stay rod 300, and the stay rod 300 rotates the links 500, and the stay rod 300 is also rotated by the rotating links 500.

Embodiment 2

In describing the headrest folding device according to the second exemplary embodiment of the present invention, same symbols will be used for the same or the similar elements as those of the headrest folding device according to the first exemplary embodiment of the present invention, and the detailed description and illustration will be omitted.

As illustrated in FIG. 6, the headrest folding device according to the second exemplary embodiment is characterized in that the driving force of a motor 1600 is delivered to a screw 1400 through a flexible shaft 1620.

The motor 1600 is not installed in a housing 1100, but instead, disposed apart from the housing 1100. The motor 1600 can be installed at the side of a seat. That is, the motor 1600 may freely installed in the other places not in the upper center of the seat wherein the housing 1100 is installed. Thus, the motor 1600 can be more effectively protected from the foreign substances or water. Also, since the motor 1600 can be disposed further away from the head or the ear of a user, the transmission of vibration, the noise, and the like towards the user can be minimized.

The shaft of the motor 1600 is connected to the flexible shaft 1620, and the flexible shaft 1620 is connected to a reduction gear 1610. A screw 1400 is connected to the reduction gear 1610.

That is, the flexible shaft 1620 delivers the driving force of the motor 1600 to the reduction gear 1610.

The reduction gear 1610 is fixedly installed in the rear surface of a front surface 1130 of the housing 1100 through bolting and the like.

Since the operation of the headrest folding device according to the second exemplary embodiment is same as the above described first exemplary embodiment, the detailed description on this matter will be omitted.

Embodiment 3

In describing the headrest folding device according to the third exemplary embodiment of the present invention, same symbols will be used for the same or the similar elements as those of the headrest folding device according to the first and the second exemplary embodiments of the present invention, and the detailed description and illustration will be omitted.

As illustrated in FIGS. 7 to 9, it is characterized in that a housing 2100 of the headrest folding device according to the third exemplary embodiment is installed in the headrest.

The housing 2100 of the present exemplary embodiment is installed inside the headrest. For example, the bracket of the housing 2100 can be installed in the cover of the headrest. Owing to this feature, the headrest folding device of the present invention can be applied directly to the existing various types of seats. In addition, when a failure occurs in the headrest folding device, only the headrest is required to be separated, therefore, the replacement and repair can be done more quickly and easily. Also, the headrest can be modularized so that manufacturing, assembling, transportation, and the like thereof can be more facilitated. Besides, since no separate cut-off portion is needed to be formed in the seat for the movement of the stay rod, the appearance of the vehicle's seat becomes neat and elegant, and the infiltration of foreign substances into the seat through the cut-off portion can be prevented.

A mid-wall 2120 is disposed in the lower portion of the housing 2100.

A motor 2600 is disposed at the upper portion of the housing 2100, and a reduction gear 2610 is installed in a front surface 2130 of the housing 2100.

A lifting member 2200, a screw 2400, a stay rod 2300, and links 2500 are disposed more downwardly than the reduction gear 2610.

The stay rod 2300 is disposed in a way that second bars 2350 are disposed more downwardly than a first bar 2310.

The second bars 2350 are inserted into the vehicle's seat. The first bar 2310 is disposed inside the headrest.

The first bar 2310 is inclinedly formed so that the upper portion thereof is disposed more rearwardly than the lower portion thereof.

Unlike this, the stay rod can be formed diversely according to the design of vehicle's skin.

When the motor 2600 is disposed inside the headrest in this way, the electric wire connected to the motor 2600 can be connected to the vehicle's power supply through the stay rod 2300.

Hereinafter, an operational process of the headrest folding device having the aforementioned configuration and according to the exemplary embodiment of the present invention will be described.

<Headrest Folding>

When the motor 2600 is operated by a user or sensors and the like, the screw 2400 is rotated thereby. As the screw 2400 is rotated, the lifting member 2200 is moved downward.

When the lifting member 2200 is moved downward, the stay rod 2300 is also being pushed downward by the lifting member 2200. Since the stay rod 2300 is fixed to the seat, the housing 2100 is being lifted up with respect to the stay rod 2300. Since the housing 2100 being lifted up is connected to the stay rod 2300 through the links 2500, it is rotated towards the counterclockwise direction. And, the stay rod 2300 is slided towards the rear direction of the lifting member 2200 as the lifting member 2200 is moving towards the lower portion.

When the lower surface of the lifting member 2200 touches the upper surface of the mid-wall 2120, the folding of the headrest is completed.

<Headrest Erection>

When the motor 2600 is operated by a user or sensors and the like, the screw 2400 is rotated towards the opposite direction. As the screw 2400 is rotated in the opposite direction, the lifting member 2200 is moved upward.

When the lifting member 2200 is moved upward, the stay rod 2300 is also lifted upward by the lifting member 2200. Since the stay rod 2300 is fixed to the seat, the housing 2100 is being pushed down with respect to the stay rod 2300. Since the housing 2100 being pushed down is connected to the links 2500, it is rotated towards the clockwise direction. And, the stay rod 2300 is slided towards the front direction of the lifting member 2200 as the lifting member 2200 is moving towards the upper portion.

When the stay rod 2300 is held by the upper ends of the stay guide grooves 2111 the erection of the headrest is completed.

Embodiment 4

In describing the headrest folding device according to the fourth exemplary embodiment of the present invention, same symbols will be used for the same or the similar elements as those of the headrest folding device according to the first, the second, and the third exemplary embodiments of the present invention, and the detailed description and illustration will be omitted.

As illustrated in FIG. 10, the headrest folding device according to the fourth exemplary embodiment is characterized in that a housing 3100 is installed in the headrest, and the driving force of a motor 3600 is delivered to a screw 3400 through a flexible shaft 3620.

A stay rod 3300 is fixedly installed in the center of a vehicle's seat, or installed in a way that the height can be adjusted along the up-down direction.

The housing 3100 is disposed inside the headrest and installed therein.

A reduction gear 3610 is installed inside the housing 3100.

The motor 3600 is installed in a vehicle's seat and the like so as to be far away from the housing 3100.

The motor 3600 can be movably installed in the vehicle's seat so as to be moved together with the housing 3100 which is being moved.

The motor 3600 is connected to the reduction gear 3610 through the flexible shaft 3620.

Thus, the driving force of the motor 3600 is delivered to the flexible shaft 3620, and the driving force of the flexible shaft 3620 is delivered to the reduction gear 3610, and the driving force of the reduction gear 3610 is delivered to the screw 3400.

The flexible shaft 3620 is inserted into the inlet hole formed in a third bar 3330, and after passing through a second bar 3350, escaped out through the withdrawing hole formed in the lower end of the second bar 3350, and finally connected to the shaft of the motor 3600. Owing to this feature, the structure can be maintained in a simple form, and at the same time, the external exposure of the flexible shaft 3620 is prevented, thereby making the appearance to be more elegant.

The headrest folding device according to the fourth exemplary embodiment does not require a cut-off portion in the seat, and at the same time, the transmission of the vibration or the noise generated from the motor 3600 towards the head of a user is prevented.

Since the operation of the headrest folding device according to the fourth exemplary embodiment is same as the third exemplary embodiment, the detailed description on this matter will be omitted.

Embodiment 5

In describing the headrest folding device according to the fifth exemplary embodiment of the present invention, same symbols will be used for the same or the similar elements as those of the headrest folding device according to the first, the second, the third, and the fourth exemplary embodiments of the present invention, and the detailed description and illustration will be omitted.

As illustrated in FIGS. 11 and 12, lift guide protrusions 4150 guiding a lifting member 4200 are formed in a housing 4100 of the headrest folding device according to the fifth exemplary embodiment.

The housing 4100 is formed in the upper center of the frame of the seat. A headrest is installed in the upper end of a stay rod 4300.

The housing 4100 of the present exemplary embodiment is formed with a plastic material, and integrally formed through injection molding.

The housing 4100 is formed in a way that a front surface, a mid-wall 4120, and sidewalls 4110 are all connected with one another. Thus, the mid-wall 4120 can support a screw 4400 more stably, and the sidewalls 4110 can support links 4500 more stably.

The lift guide protrusions 4150 are formed in the rear surface of the front surface of the housing 4100 for guiding the lifting and lowering of the lifting member 4200. Since such lift guide protrusions 4150 are integrally provided in the housing 4100, there is no need to provide a separate lift guide rod and the like so that the number of components is reduced, and furthermore, since it is formed with a plastic material the total weight is also reduced, and the device can also be maintained more compactly.

The lift guide protrusions 4150 are formed in the shape of a plate, and formed at the both sides of the lifting member 4200 along the up-down direction.

The lift guide protrusions 4150 are disposed away from the sidewalls 4110.

The links 4500 of the present exemplary embodiment are disposed between the lift guide protrusions 4150 and the sidewalls 4110. That is, since the links 4500 are disposed inside the housing 4100, the device becomes more compact and prevents the links 4500 from being interfered with the external components. Also, the links 4500 can be protected from the dust or the foreign substances.

A supporting plate 4160 is formed horizontally and rearwardly protruded in the rear surface of the front surface of the housing 4100.

The supporting plate 4160 is formed so as to connect the both sidewalls 4110 and the front surface.

A screw through hole wherein the screw 4400 is penetrating is formed in the supporting plate 4160.

The supporting plate 4160 is disposed in the lower side of the lifting member 4200.

The lifting member 4200 is held by the mid-wall 4120 when the folding is completed, and held by the supporting plate 4160 when the erection is completed.

Further, in the lifting member 4200, protrusions 4202 are formed in length along the front-to-rear direction in the surface being contacted with the stay rod 4300.

The protrusions 4202 are disposed inside a guide slot 4201, and formed in multiple numbers.

Owing to such protrusions 4202, the friction between the lifting member 4200 and the stay rod 4300 is reduced so that the sliding of the stay rod 4300 can be performed more smoothly.

Since the operation of the headrest folding device according to the present exemplary embodiment is same as the first exemplary embodiment, the detailed description on this matter will be omitted.

Embodiment 6

In describing the headrest folding device according to the sixth exemplary embodiment of the present invention, same symbols will be used for the same or the similar elements as those of the headrest folding device according to the first, the second, the third, the fourth, and the fifth exemplary embodiments of the present invention, and the detailed description and illustration will be omitted.

As illustrated in FIG. 13, it is characterized in that in a housing 5100 of the headrest folding device according to the sixth exemplary embodiment, a lift guide protrusion 5150 is formed for guiding a lift member 5200, and the driving force of a motor 5600 is delivered to a screw 5400 through a flexible shaft 5620.

The housing 5100 is installed in the upper center of the frame of a seat. A headrest is installed in the upper end of a stay rod 5300.

The housing 5100 of the present exemplary embodiment is formed with a plastic material, and integrally formed through injection molding.

The lift guide protrusions 5150 are formed in the rear surface of the front surface of the housing 5100 for guiding the lifting and lowering of the lifting member 5200.

The motor 5600 is not installed in the housing 5100, but instead, disposed away from the housing 5100.

The shaft of the motor 5600 is connected to the flexible shaft 5620, and the flexible shaft 5620 is connected to a reduction gear 5610. A screw 5400 is connected to the reduction gear 5610.

That is, the flexible shaft 5620 delivers the driving force of the motor 5600 to the reduction gear 5610.

The reduction gear 5610 is fixedly installed in the rear surface of a front surface of the housing 5100 through bolting and the like.

Since the operation of the headrest folding device according to the sixth exemplary embodiment is same as the above described first exemplary embodiment, the detailed description on this matter will be omitted.

Embodiment 7

In describing the headrest folding device according to the seventh exemplary embodiment of the present invention, same symbols will be used for the same or the similar elements as those of the headrest folding device according to the first, the second, the third, the fourth, the fifth, and the sixth exemplary embodiments of the present invention, and the detailed description and illustration will be omitted.

As illustrated in FIG. 14, it is characterized in that a housing 6100 of the headrest folding device according to the seventh exemplary embodiment is disposed inside the headrest, and a lift guide protrusion is formed in the housing 6100 for guiding a lifting member 6200.

The housing 6100 of the present exemplary embodiment is installed inside the headrest. The lower portion of a stay rod 6300 is installed in the vehicle's seat.

The housing 6100 of the present exemplary embodiment is formed with a plastic material, and integrally formed through injection molding. The lift guide protrusions are integrally formed in the rear surface of the front surface of the housing 6100.

In this way, by installing a housing 6100 with reduced weight in the headrest, the headrest folding device can be immediately applied to the existing vehicles while the weight of the headrest is maintained.

A motor 6600 is installed in the upper portion of the housing 6100.

The motor 6600 is disposed more upwardly than links 6500, the lifting member 6200, and the stay rod 6300.

Since the operation of the headrest folding device according to the seventh exemplary embodiment is same as the above described third exemplary embodiment, the detailed description on this matter will be omitted.

Embodiment 8

In describing the headrest folding device according to the eighth exemplary embodiment of the present invention, same symbols will be used for the same or the similar elements as those of the headrest folding device according to the first, the second, the third, the fourth, the fifth, the sixth, and the seventh exemplary embodiments of the present invention, and the detailed description and illustration will be omitted.

As illustrated in FIG. 15, it is characterized in that a housing 7100 of the headrest folding device according to the eighth exemplary embodiment is disposed inside the headrest, wherein a lift guide protrusion guiding a lift member 7200 is installed in the housing 7100, and the driving force of a motor 7600 is delivered to a screw 7400 through a flexible shaft 7620.

A stay rod 7300 is fixedly installed in the center of a vehicle's seat or installed in a way that the height is adjustable along the up-down direction.

The housing 7100 is integrally formed with a plastic material through injection molding.

The motor 7600 is installed inside the seat and the like so as to be located away from the housing 7100. In this way, by installing the motor 7600 in a place other than the headrest, a cut-off portion needs not to be formed in the seat, and at the same time, the weight of the headrest can be maintained light.

The motor 7600 is connected to a reduction gear 7610 through the flexible shaft 7620.

In a second bar and a third bar of the stay rod 7300, a hole is formed for withdrawing or inserting the flexible shaft 7620 is formed. Thus, the flexible shaft 7620 is disposed to be passing through the stay rod 7300.

Since the operation of the headrest folding device according to the eighth exemplary embodiment is same as the above described third exemplary embodiment, the detailed description on this matter will be omitted.

As described above, although the present invention has been described with reference to the preferred exemplary embodiments, various changes and alterations of the present invention can be made by those skilled in the art without departing from the spirit and the scope of the present invention written in the claims described herein below.

DESCRIPTION OF SYMBOLS

Description of Numerals for Major Elements in Drawings

100: housing
110: sidewall
120: mid-wall
130: front surface
140: bracket
200: lifting member
201: guide groove
290: lift guide rod
300: stay rod
310: first bar
330: third bar
350: second bar
400: screw
500: link 510: hinge shaft
600: motor
610: reduction gear

The invention claimed is:
1. A headrest folding device comprising:
a housing;
a pair of links rotatably installed in the housing; and
a lifting member installed in the housing in a way that it can be lifted or lowered,
wherein a stay rod is connected to the links,
wherein the stay rod is slidingly installed in the lifting member,
wherein a screw rotatably installed in the housing and driven by a motor is further included,
wherein the screw is screw-coupled to the lifting member,
wherein the housing comprises sidewalls respectively disposed at both sides thereof and a mid-wall disposed between the both sidewalls,
wherein the links are installed in the both sidewalls respectively,
wherein the screw is rotatably installed in the mid-wall,
wherein the lifting member is disposed between the both sidewalls,
wherein the stay rod comprises a first bar disposed along the left-to-right direction and a second bar disposed formed at both sides of the first bar and disposed along the up-down direction,
wherein the first bar is slidingly installed along the front-to-rear direction in the lifting member,
wherein the first bar is disposed at the rear side of the screw, and
wherein the both sides of the first bar are respectively connected to the links.

2. The headrest folding device according to claim 1,
wherein a guide slot wherein the first bar is inserted is formed in the lifting member along the front-to-rear direction, and
wherein the guide slot is formed in a way that the rear side thereof is open.
3. The headrest folding device according to claim 1,
wherein a pair of lift guide rods is installed in the housing, and
wherein a pair of lift guide slots, wherein the lift guide rods are inserted, is formed in the lifting member.
4. The headrest folding device according to claim 3,
wherein the housing is installed in a vehicle's seat.
5. The headrest folding device according to claim 3,
wherein the housing is installed in a headrest.
6. The headrest folding device according to claim 3,
wherein the driving force of the motor is delivered to the screw through a flexible shaft.
7. The headrest folding device according to claim 3,
wherein the motor is installed in the housing.
8. The headrest folding device according to claim 1,
wherein a lift guide protrusion guiding the lifting member is formed in the housing.
9. The headrest folding device according to claim 8,
wherein the driving force of the motor is delivered to the screw through a flexible shaft.
10. The headrest folding device according to claim 8,
wherein the motor is installed in the housing.
11. The headrest folding device according to claim 8,
wherein the housing is installed in a vehicle's seat.
12. The headrest folding device according to claim 8,
wherein the housing is installed in a headrest.

* * * * *